US007532861B2

(12) United States Patent
Ranta et al.

(10) Patent No.: US 7,532,861 B2
(45) Date of Patent: May 12, 2009

(54) CONNECTION INTERFACE FOR CONVEYING RF, DATA, AND POWER BETWEEN ELECTRONIC DEVICES

(75) Inventors: Craig Steven Ranta, Redmond, WA (US); Wayne King, Stirling (AU)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 11/020,995

(22) Filed: Dec. 23, 2004

(65) Prior Publication Data

US 2006/0139833 A1 Jun. 29, 2006

(51) Int. Cl.
*H04B 7/24* (2006.01)

(52) U.S. Cl. ............................ 455/39; 455/45; 455/42; 361/113; 370/395; 370/488; 370/490

(58) Field of Classification Search .................. 455/39, 455/45, 42; 361/113; 370/395, 488, 490
See application file for complete search history.

(56) References Cited

U.S. PATENT DOCUMENTS 5,870,395 A * 2/1999 Baran ...................... 370/395.1
7,397,425 B2 * 7/2008 Ranta et al. ................ 342/374
2006/0139833 A1 * 6/2006 Ranta et al. ................ 361/113

* cited by examiner

*Primary Examiner*—Matthew D Anderson
*Assistant Examiner*—April S Guzman
(74) *Attorney, Agent, or Firm*—Workman Nydegger

(57) ABSTRACT

An interface enables an RF signal, a DC power signal, and a data signal to be conveyed between two devices over a single RF cable. In an exemplary application of this invention, a steerable antenna system is coupled to a wireless adapter for use in a wireless network. The steerable antenna includes a plurality of panels that can be selectively activated in response to the data signal, which also determines a direction in which an RF signal is transmitted or received by a selected panel of the antenna. Low pass filters in each device isolate the DC power supply and the load from the other two signals. High pass filters isolate the radio in the wireless adapter and the antenna array from the DC and data signals. The data signal is preferably encoded into a Manchester format that passes through a bandpass filter provided in each device.

19 Claims, 4 Drawing Sheets

CONNECTION INTERFACE FOR CONVEYING RF, DATA, AND POWER BETWEEN ELECTRONIC DEVICES

FIELD OF THE INVENTION

This invention generally pertains to apparatus and a method for minimizing the number of conductors employed for carrying multiple types of signals between two electronic devices, and more specifically, for conveying radio frequency (RF) signals, data, and electrical power between two devices over a coaxial cable, for example, between a wireless device and a steerable antenna system.

BACKGROUND OF THE INVENTION

As an increasing number of computer users install wireless networks that meet the Institute of Electrical and Electronics Engineers (IEEE) 802.11 specifications in their homes and workplaces, it has become apparent that the performance (i.e., range and data rate) of such systems often fails to meet their expectations. Structures built of stone or brick, or which contain blocking interior elements, such as a fireplace or metal walls, often have problems with achieving adequate RF coverage at a desired data throughput. Throughput can be very important when the signal being conveyed is a video or other multimedia signal that cannot be interrupted or delayed without noticeable adverse effects. The actual data rate that can be achieved quickly decreases as the distance between wireless communication devices and other factors reduce the received signal strength of the wireless transmissions.

One way to address this problem is to use a steerable antenna system to more efficiently control the direction in which a wireless device transmits or receives a radio signal. The benefits of electronically steerable antennas used in radio communications systems are well known. Electronically steerable antennas have been in use for decades in military, aerospace, and cellular applications, but the advantages have remained out of the reach of consumer applications due to cost and complexity. With the widespread adoption of the IEEE 802.11 family of wireless networking standards, it is contemplated that cost effective electronically steerable antennas will soon be a mainstream consumer product. However, including this technology in consumer wireless networking systems will still impose a considerable cost increase, and a manufacturer of such equipment may not wish to impose this added cost on all versions of a particular product within an extremely cost competitive and crowded market. In this case, a viable option is to offer the steerable antenna system as a separately purchasable accessory upgrade.

The problem with offering the electronically steerable antenna as add-on upgrade is that it requires more than a single type of electrical connection to a wireless device that is transmitting or receiving the radio signals. Whereas a standard passive antenna requires only a single RF connection, an electronically steerable antenna typically additionally requires DC power and a control interface of some type. This connection interface would commonly be handled by employing two separate connectors and two cables to connect the accessory antenna to the wireless device. One cable would then be used for carrying RF signals, and the other cable would convey power and control signals (binary data used to control the steering of the steerable antenna system). Low cost standard connectors that are designed to carry all of these diverse types of signals do not exist. However, this approach still has two drawbacks . . . the additional connectors and cable still add significant cost, and it is undesirable from an ease of use and reliability standpoint to require the user to connect two different cables to attach the accessory steerable antenna to the wireless device.

Accordingly, a low cost way is needed to combine all the required signals for the steerable antenna accessory into a single standard RF connection, eliminating the need for an additional connector and cable assembly, lowering unit cost, increasing reliability, and improving ease of installation for consumer end user. Such a solution to this problem should enable this substantially more complex steerable antenna accessory to be installed by an unskilled user in an identical manner to a conventional antenna, using standard connectors.

SUMMARY OF THE INVENTION

To avoid requiring a user of a steerable antenna system having to connect a power lead, a control data lead for controlling the direction in which the antenna transmits or receives, and an RF signal lead to a steerable antenna system. It is also contemplated that the present invention can be employed in other applications in which there is a need to minimize the number of discrete leads that must be interconnected between two devices.

Accordingly, a first aspect of the present invention is directed to apparatus for conveying a plurality of signals over an RF cable connecting a first device and a second device. The plurality of signals include a direct current (DC) electrical power signal, a data signal, and an RF signal. The RF signal is provided at either the first device or the second device and is used at the other device. At the first device, the apparatus includes a first low pass filter that is coupled between a DC power source and the RF cable. This first low pass filter passes the DC electrical power signal, but substantially blocks all other of the plurality of signals. Also included at this first device is a first bandpass filter that is coupled between a source of the data signal and the RF cable. The first bandpass filter passes data carried by the data signal, but substantially blocks all other of the plurality of signals. At the second device is a second low pass filter that is coupled between the RF cable and an electrical load that uses the DC electrical power signal conveyed over the RF cable. The second low pass filter passes the DC electrical signal to the electrical load, but substantially blocks all other of the plurality of signals. A second bandpass filter at the second device is coupled to the RF cable and has an output at which the data are accessible for use. A first high pass filter is coupled to the RF cable and is disposed at the device where the RF signal is provided. The first high pass filter receives the RF signal and passes it to the RF cable, but substantially blocks all other of the plurality of signals. A second high pass filter is also coupled to the RF cable at the device where the RF signal is received over the RF cable. This second high pass filter passes the RF signal for use by the device receiving the RF signal, but substantially blocks all other of the plurality of signals.

A modulator is preferably coupled between the source of the data signal and the first bandpass filter. The modulator produces a modulated data signal that is passed through the bandpass filter and carried over the RF cable. A corresponding demodulator is coupled to an output of the second bandpass filter and demodulates the modulated signal to provide the data signal for use at the second device.

The apparatus can optionally include a serial-to-parallel converter disposed at the second device and coupled to receive the data signal. The serial-to-parallel converter converts serial data included in the data signal to parallel data for use at the second device.

The modulator preferably produces modulated data in a format that does not have a direct current component. Therefore, the modulator produces the modulated data signal in a frequency range having a maximum frequency that is substantially less than a frequency of the RF signal.

The data signal preferably comprises binary data having a plurality of bits. The modulator converts the data signal to a format in which for each bit, the modulated signal is above a zero voltage level for substantially a same period of time as it is below the zero voltage level. As a result, the modulated data signal has an average voltage level of zero.

The first device preferably comprises a wireless adaptor, and the second device preferably comprises a steerable antenna system. In this case, the RF signal is used to communicate over a wireless network. Moreover, the data signal is used to control a direction in which the radio signal is either transmitted or received by a steerable antenna.

Another aspect of the present invention is directed to a method for conveying a plurality of different types of signals between two devices over a radio frequency (RF) cable having a single conductor with a shield. The plurality of different types of signals range in frequency from a direct current (DC) signal to an RF signal. The steps of the method are generally consistent with the functions implemented by the apparatus discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
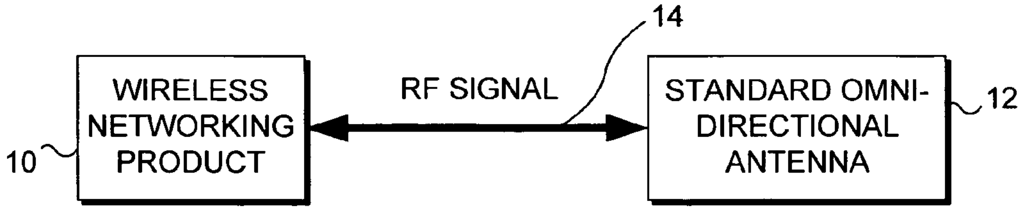
FIG. 1 (PRIOR ART)
FIG. 1 (Prior Art) is a block diagram illustrating a conventional interconnection between a wireless networking product and a standard omni-directional antenna.

As shown in FIG. 1 (Prior Art), a conventional wireless networking product 10 is typically connected to a standard omni-directional antenna 12 by an RF cable 14 that conveys an RF signal between the wireless networking product and the antenna. Since the only signal that must be conveyed between the two devices is the RF signal, it is relatively straightforward to accomplish this function with the RF cable. Indeed, standard omni-directional antenna 12 is often directly coupled to wireless networking product 10, and a user is not required to make the connection unless an external antenna is to be used. In this case, RF cable 14 must be connected to both the wireless networking product and the antenna.

Figure 2:
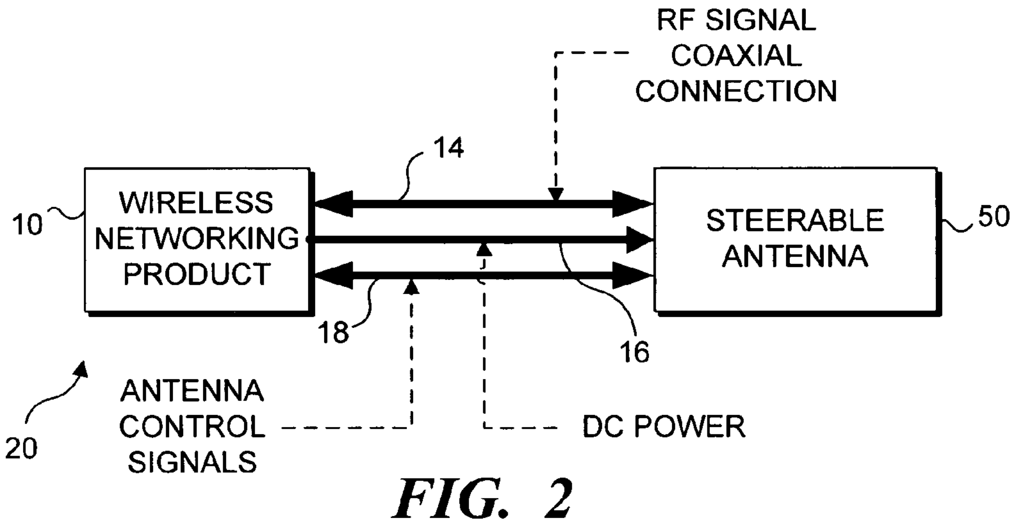
FIG. 2 (PRIOR ART)
FIG. 2 (Prior Art) is a block diagram illustrating how an electronically steerable antenna requires a plurality of separate cables for connecting to a wireless product.

A block diagram 20 in FIG. 2 illustrates the increased complexity involved in connecting an electronically steerable antenna 50 to wireless networking product 10. Three very different signals are required by electronically steerable antenna 50 and conventionally, each of these signals is carried over a separate and distinct cable. Specifically, in addition to RF cable 14 that conveys the RF signal between the wireless networking product and the steerable antenna, a cable 16 conveys a DC electrical power signal from wireless networking product 10 to energize electronically steerable antenna 50, and a cable 18 is employed to convey the digital or analog antenna control signals that are used for selecting a direction in which the electronically steerable antenna transmits or receives an RF signal. Accordingly, cables 14, 16, and 18 must all be connected to enable wireless networking product 10 to employ the electronically steerable antenna, and it may be necessary for a user to connect the ends of these three cables (or two cables if the power and control data signals are included in one cable) at least when initially setting up the wireless networking product to use the electronically steerable antenna. As noted above, it is preferable to minimize the number of leads or cables that must be connected when setting up a wireless product for use. The present invention was therefore developed to provide means enabling a single RF cable (i.e., a single conductor with ground) to carry all three of the signals shown in FIG. 2.

Figure 3:
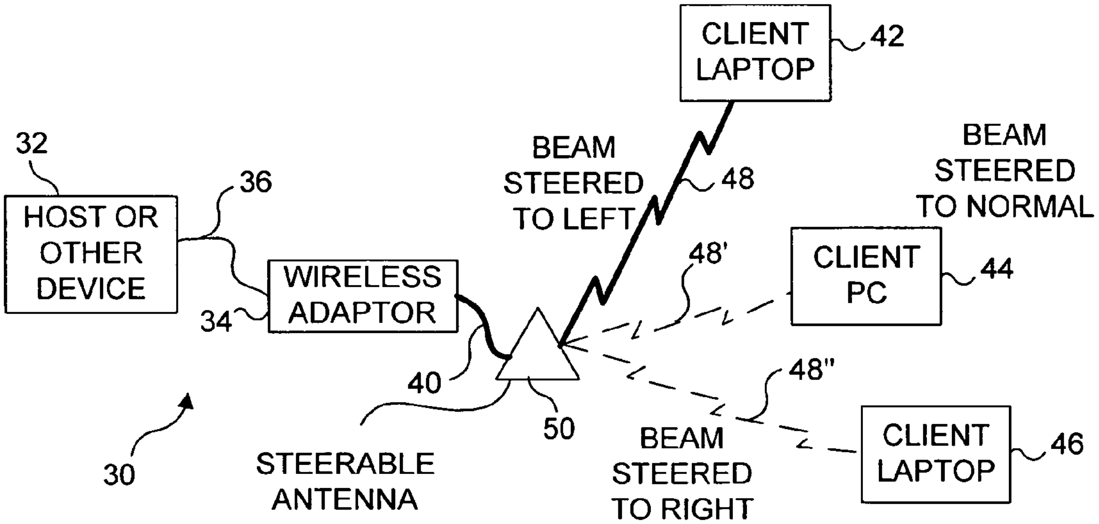
FIG. 3 is a schematic block diagram illustrating how a steerable antenna system uses the present invention to convey the signals shown in FIG. 2, so that a steerable antenna system is able to be steered to a selected client device in a wireless network.

A block diagram 30 in FIG. 3 more clearly illustrates an advantage of using steerable antenna 50 in a wireless network, wherein a host (or other device) 32 is coupled to a wireless adapter 34 by a cable 36, and the wireless adapter is in turn connected through a single RF cable 40 to steerable antenna 50. In this example, steerable antenna 50, which comprises a three-sided polygon, is shown currently communicating with a client laptop 42 in an antenna beam direction 48. This beam has been steered to the left of a perpendicular to one of three generally planar panels of steerable antenna 50. Any one of these three planar panels can be electronically selected for transmission or reception of an RF signal. From any one of the panels, the beam along which a transmission or reception of the RF signal occurs can be steered either to the left, to the right, or be on the perpendicular to the panel outer surface. For example, as also shown in this Figure, steerable antenna 50 can alternatively communicate with a client PC 44 over an antenna beam direction 48' that is generally perpendicular to the panel that is currently selected, or with a client laptop 46 over an antenna beam direction 48" that is steered to the right of perpendicular to the surface of this panel. Accordingly, the antenna beam direction used for transmission or reception of an RF signal by steerable antenna 50 can be selectively controlled in response to a digital control signal that is conveyed over RF cable 40. The selected direction can be in any one of three different directions, relative to a selected one of three different panels comprising steerable antenna 50, to provide a coverage of 360° around the steerable antenna system.

Figure 4:
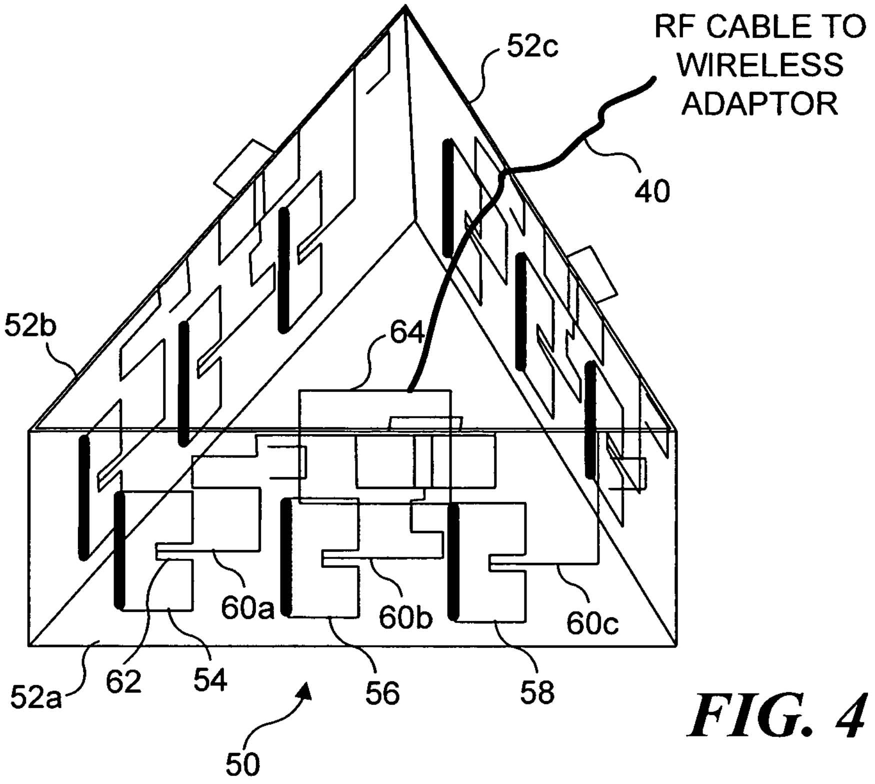
FIG. 4 is an isometric view of a steerable antenna with which the present invention is usable.
Figure 5:
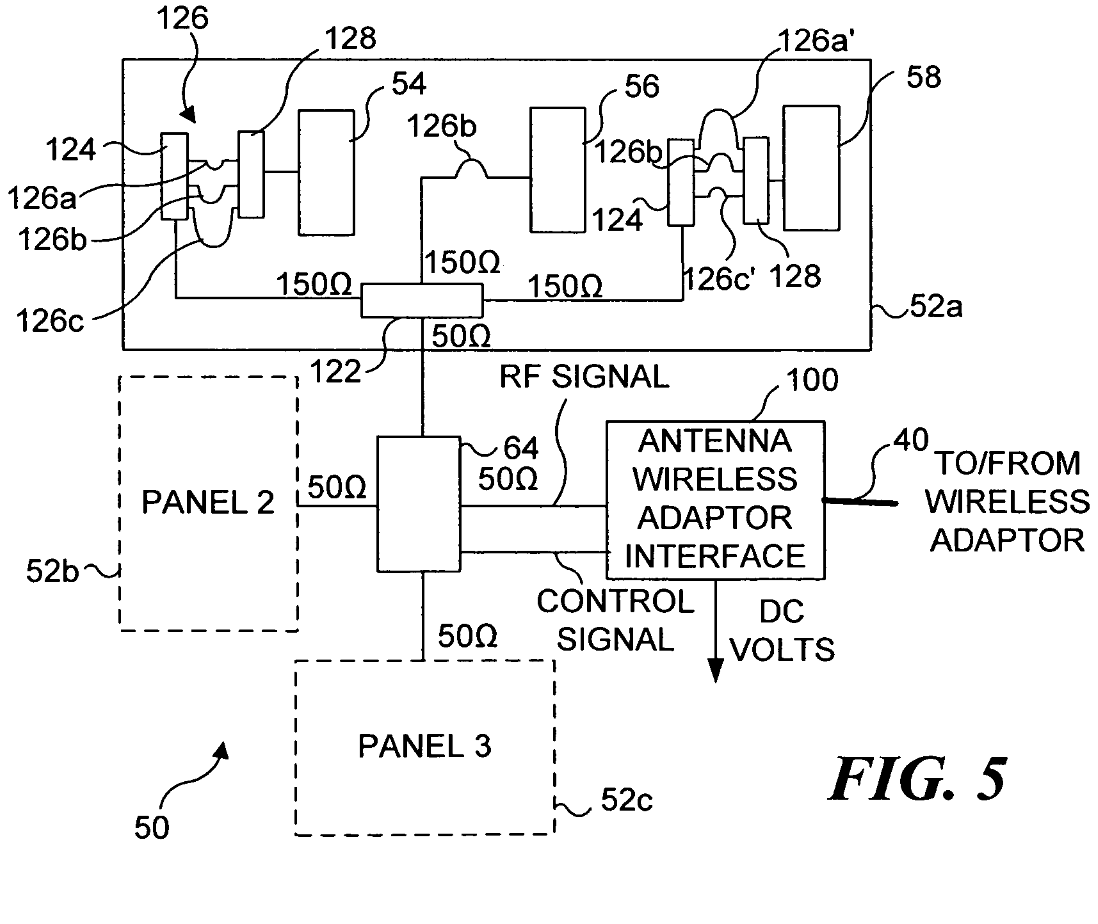
FIG. 5 is a schematic block diagram of the electronic components used in the steerable antenna of FIG. 4.

Further details of steerable antenna 50 are illustrated in FIGS. 4 and 5. Although steerable antenna 50 is not a component of the present invention (but is described and claimed in a co-pending, commonly assigned patent application, entitled "ELECTRONICALLY STEERABLE SECTOR ANTENNA," Ser. No. 11/027,748, filed Dec. 30, 2004), it will be helpful to better understand its functionality to appreciate why the three different signals are required for its operation in connection with the present invention. As explained above, steerable antenna 50 includes three relatively planar panels 52*a*, 52*b*, and 52*c* that are mechanically joined at their ends, forming an equilateral triangular-shaped polygon. Each panel is substantially identical to the others. Accordingly, only the elements on panel 52*a* are discussed herein. Panel 52*a* includes three microstrip conductor antennas 54, 56, and 58 that are spaced apart from each other, forming a phased array antenna on the panel. These microstrip conductor antennas are formed of copper microstrip traces on the printed circuit board comprising panel 52*a*. Suitable laminate materials for the panels must have dielectric and other characteristics appropriate for use at frequencies of 2.4 GHz and above in this application. Much of the inwardly facing surface of each of these three panels is covered with a copper layer (not shown for purposes of clarity) that is connected to an earth ground.

When viewed looking outwardly from the outer facing surface of the panel, microstrip conductor antenna 54 is located toward the right end of panel 52*a* and microstrip conductor antenna 58 is located toward the left end of the panel. Thus, microstrip conductor antenna 54 is also referred to herein as the "right antenna" on the panel, microstrip conductor antenna 58 is referred to herein as the "left antenna" on the panel, and microstrip conductor antenna 56 is also referred to as the "center antenna." The left and right antennas on each panel can each be selectively connected to one of three different length delay lines (which are not shown in FIG. 4, but are discussed in greater detail below in regard to FIG. 5). The delay line circuitry is respectively coupled to microstrip conductor antenna 54, 56, and 58 through printed circuit traces 60*a*, 60*b*, and 60*e*, which are routed on the panel to ensure that they are of equal length. An impedance matching notch 62 is formed in each of the three microstrip conductor antennas, where joined to these printed circuit traces of each antenna.

Steerable antenna 50 is thus able to transmit and receive RF signals in three sectors corresponding to its three panels. However, only one of panels 52*a*, 52*b*, and 52*c* is active at a time. A 3:1 RF switch 64 (FIG. 4) operates in response to a panel selection signal, to select one of the three panels as active for transmitting or receiving an RF signal at any time. 3:1 switch 64 also includes other components discussed below in connection with FIG. 6 that enable RF cable 40 to convey three signals, including the RF signal, the DC power supply signal, and the digital control data signal employed for panel selection and steering direction selection. The panel that is selected as active can be employed either for transmitting or receiving an RF signal within the sector associated with the panel. Each of the three sectors covers about 120° of arc, and together, all three sectors cover the full 360° around steerable antenna 50. More importantly, however, each panel is able to selectively transmit or receive in one of three different directions that together encompass the sector associated with the panel. The direction in which a panel transmits or receives in its sector depends upon the delay lines that are used for the left and right antennas on the panel relative to the center antenna. The center antenna on the panel is the reference phase, and the outer two left and right antennas can either be fed through a delay line that is shorter, longer, or equal to the phase delay of the reference center antenna. When the left antenna is coupled with the long delay and the right antenna with a short delay, the beam is steered to the left of a perpendicular to the panel. Conversely, when the right antenna is coupled with a long delay and the left antenna with the short delay, the beam is steered to the right of the perpendicular. When a common delay is used for all three antennas comprising the phased array on the panel, the beam is directed generally perpendicular to the panel.

FIG. 5 shows still further details for panel 52*a*. Microstrip delay lines 126 that are used for the right antenna include a relatively shorter delay line 126*a* and a relatively longer delay line 126*c*, compared to a reference delay line 126*b*. For the left antenna, a relatively longer delay line 126*a*' and a relatively shorter delay line 126*c*' are employed. Thus, delay line 126*a* and 126*a*' would be selected by the PIN diode drivers for the right and left antennas, respectively, to steer the beam toward the left of perpendicular, since the left antenna would then be driven with a longer delay, compared to the right antenna. Conversely, to steer the beam toward the right of perpendicular, delay lines 126*c* and 126*c*' would be chosen for the right and left antennas, respectively. Delay line 126*b* would be selected for all three antennas on the panel to direct the beam generally perpendicular to the surface of the panel.

Preferred Embodiment of Interface

Figure 6:
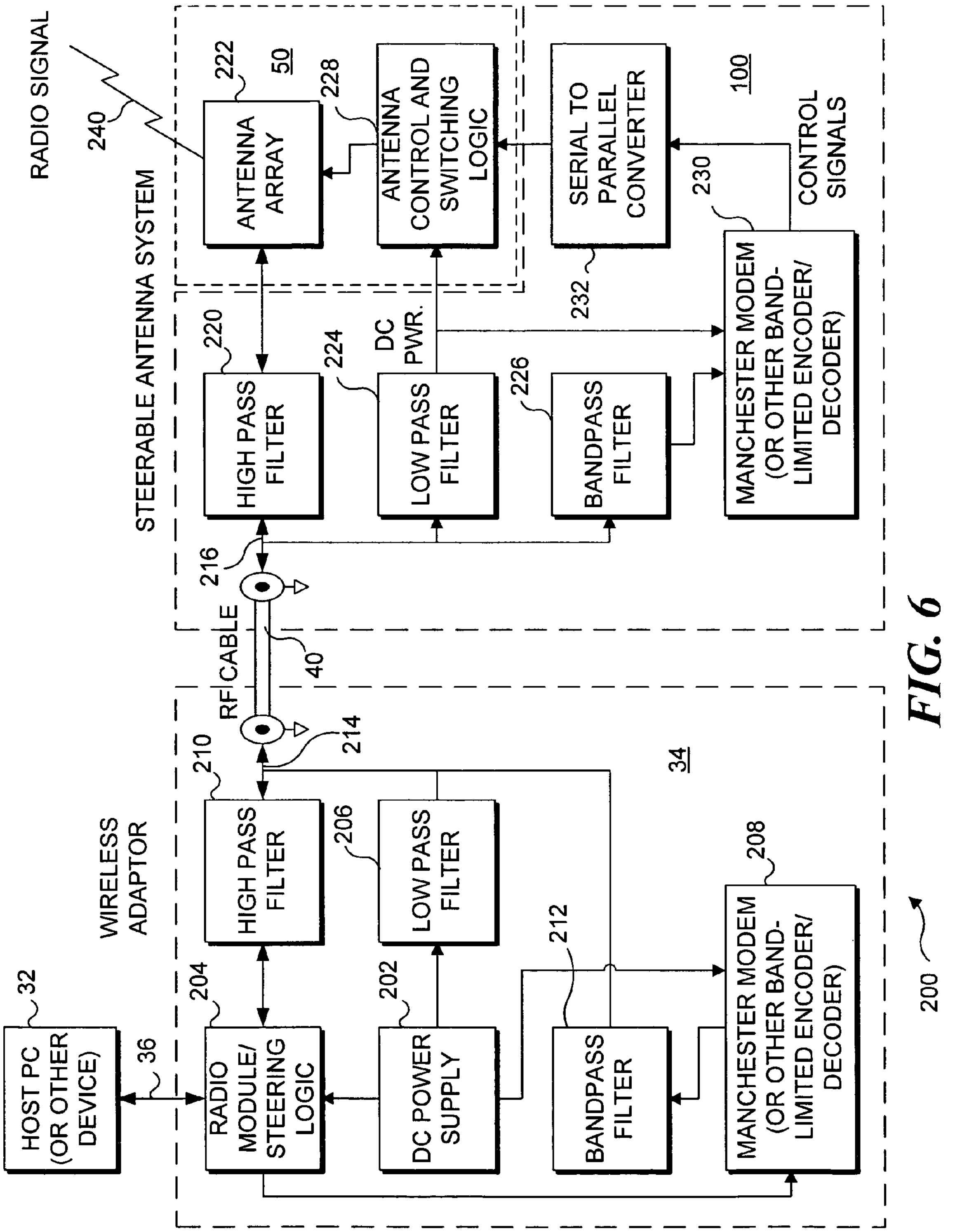
FIG. 6 is a functional schematic block diagram illustrating the components used in a wireless adapter and a steerable antenna system for communicating DC power, an RF signal, and control data over a single RF cable.

A block diagram 200 shown in FIG. 6 illustrates the functional components of the present invention. On the left side of this Figure are disposed host PC (or other device) 32 and wireless adapter 34, while on the right side is disposed the steerable antenna system, which includes steerable antenna 50. In this embodiment, the steerable antenna system includes components 100 that are separate and distinct from the functional components required by the steerable antenna to select the panel that is active and to select the antenna beam direction. RF cable 40 interconnects wireless adapter 34 with components 100 in the steerable antenna system.

Included within wireless adapter 34 is a DC power supply 202, which provides appropriate DC voltages to several components in the wireless adapter and also, via RF cable 40, to several components in the steerable antenna system. In the wireless adapter, DC power supply 202 is connected to a radio module/steering logic block 204. This block includes the conventional components of a wireless radio or transceiver, which are not shown in detail, since they do not directly relate to this invention. Also included within this block is a reduced instruction set computer (RISC) or other appropriate processor and memory (neither separately shown) for generating digital control signals that are used for selecting one of the panels, and on that panel, for selecting one of the three different antenna beam directions in which an RF signal is either transmitted or received by the steerable antenna system. In addition, DC power supply 202 is connected to a low pass filter 206 and to a Manchester modem (or other band-limited encoder/decoder) 208.

Figure 8:
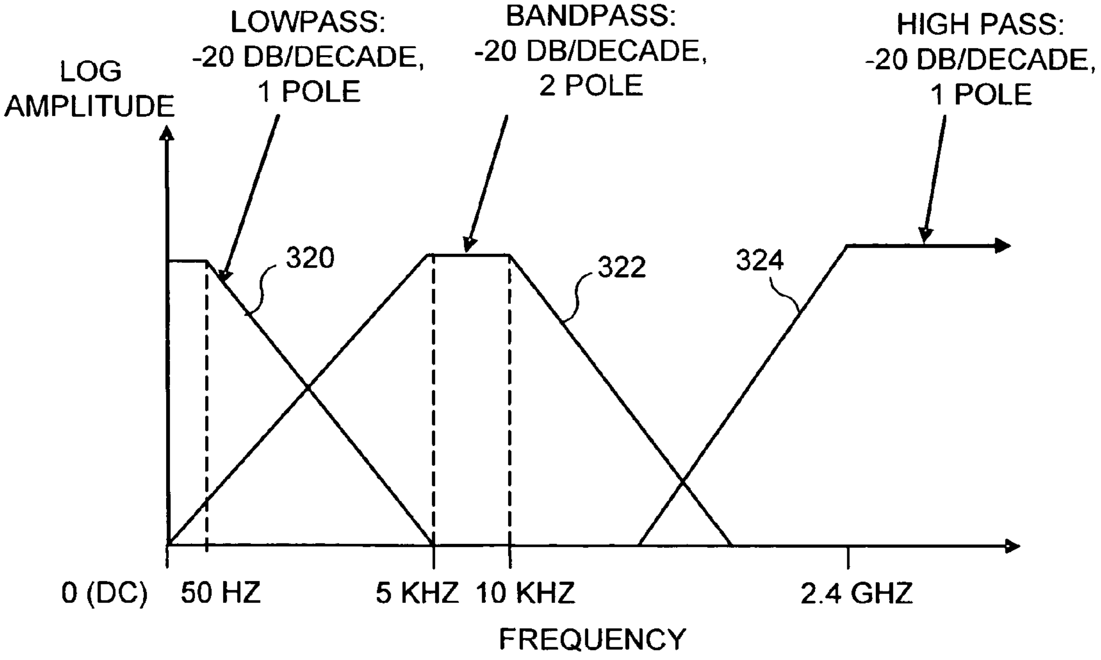
FIG. 8 is a graph showing an exemplary log amplitude vs. frequency characteristic for each of three different types of filters used in the present invention.

The characteristics of low pass filter 206 are selected to ensure that it passes a DC power signal, but substantially blocks higher frequency signals, including the RF signal and the digital control data signal that must be conveyed to the electronically steerable antenna. Specifically, these characteristics for the low pass filter are chosen to limit the amount of the control data signal that can pass into the DC power supply to an acceptable level. In an exemplary preferred embodiment, 40 dB of voltage attenuation (a factor of 100) provided by low pass filter 206 has been found sufficient. In order to use a single pole filter, there must be at least two frequency decades of headroom for the filter to act. FIG. 8 illustrates a logarithmic amplitude versus frequency characteristic 320 for the low pass filter, showing that a pole of 50 Hz was selected in this example, since the control data signal pass band ranges from 5 kHz to 10 kHz in this embodiment. The RF signal is at 2.4 GHz or higher and therefore contributes virtually nothing to the signal passed by the low pass filter.

The control data signal output from radio module/steering logic block 204 is input to Manchester modem (or other band-limited encoder/decoder) 208, which encodes the control data signal into a format having an average DC level equal to zero volts. The ability of a Manchester modem to produce such an encoded format signal is well known to those of ordinary skill in the art. Alternatively, other types of encoders could be used that also have this characteristic, including those that produce a Miller code (or MFM code), data difference modulation (DDM) code, or other types of symmetrical bi-phase codes. The output format signal produced by any of these types of encoders can pass through transformers or capacitors, since there is no DC component. Accordingly, the output of Manchester modem 208 is applied to a bandpass filter 212, which passes the encoded control data signal, but substantially blocks the DC power supply signal and the RF signal. The output of bandpass filter 212, and the output of low pass filter 206 are connected to RF cable 40 through a lead 214.

Figure 7:
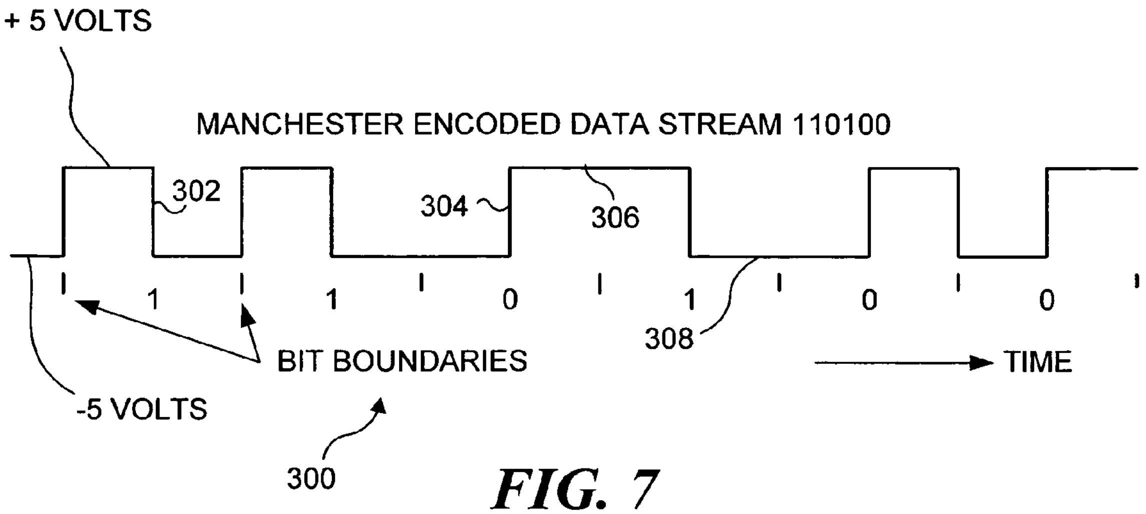
FIG. 7 illustrates the format used by a Manchester modem for encoding an exemplary string of bits.

FIG. 7 illustrates an exemplary Manchester encoded data stream 300 for the bits 110100. This encoded data stream ranges between −5 volts and +5 volts. The transition or boundaries between each of the bits are indicated in this Figure. A transition 302 from +5 volts to −5 volts that is centered between the bit boundaries identifies a bit 1, while a transition 304 from −5 volts to +5 volts that is centered between the bit boundaries identifies a bit 0. A transition 306 from a bit 0 to a bit 1 stays high across a bit boundary, while a transition 308 from a bit 1 to a bit 0 stays low across a bit boundary. Accordingly, it will be evident that the lowest fundamental frequency of this encoded signal will correspond to a succession of bits 101010 . . . , while the highest fundamental frequency will correspond to a succession of either bits 1111 . . . , or bits 0000. Thus, the bandpass frequency range in this embodiment is from 5 kHz to 10 kHz, which corresponds to these two bit pattern fundamental frequency extremes. For any bit, the signal is high for the same period of time that it is low, so the average level for the encoded signal is always zero volts.

FIG. 8 includes a characteristic curve 322 for bandpass filter 212, which is a two pole filter having an attenuation of 20 dB below a pole at 5 kHz and above a pole at 10 kHz. It will be understood by those of ordinary skill in the art that other bandpass frequency ranges could be selected for bandpass filter 212 and that other attenuation slopes could be employed.

In this exemplary preferred embodiment, the high pass filter is a one pole filter having a 20 dB per decade attenuation, as indicated by a characteristic curve 324 in FIG. 8. The pole is set at 2.4 GHz, since that is the minimum frequency typically used for communicating in a wireless network that conforms to one of the IEEE 802.11 specifications.

Since the steerable antenna system can either receive an RF signal or transmit it, radio module/steering logic block 204 can either provide the radio signal (which was received from host PC (or other device) 32 over lead 36), or can accept the RF signal that was received by the steerable antenna system and conveyed to it over RF cable 40. Therefore, a high pass filter 210 is connected between radio module/steering logic block 204 and RF cable 40 to pass the RF signal in either direction, but substantially block both the DC power signal and the encoded control data signal.

At the steerable antenna system, RF cable 40 is connected to a high pass filter 220, a low pass filter 224, and a bandpass filter 226 through a lead 216. High pass filter 220 is substantially identical to high pass filter 210, and low pass filter 224 is substantially identical to low pass filter 206. Similarly, bandpass filter 226 is substantially identical to bandpass filter 212. The DC power supply signal conveyed over RF cable 40 is passed through low pass filter 224 and is used to energize a Manchester modem (or other band-limited encoder/decoder) 230 as well as antenna control and switching logic in a block 228, which is included within steerable antenna 50. Substantially all of the other two signals conveyed by RF cable 40 are blocked by low pass filter 224 from reaching these two components that are supplied the DC power signal.

The encoded control data signal is passed through bandpass filter 226 to Manchester modem (or other band-limited encoder/decoder) 230, which decodes the encoded control data signals. These decoder control signals are conveyed to an optional serial to parallel converter 232 (considered an optional component, since it is only needed in this particular application where the control signals applied to antenna control and switching logic block 228 must be in parallel format.

High pass filter 220 is connected bi-directionally with an antenna array 222, wherein the panel and antenna beam direction have been selected in accord with the control data signals that were conveyed over RF cable 40. Accordingly, antenna array 222 can either receive or transmit an RF signal 240 from one of the panels that is selected, and in an antenna beam direction determined by the control data signals. If the RF signal is to be transmitted, it is conveyed from wireless adapter 34 through RF cable 40 and passes through high pass filter 220 to antenna array 222. Conversely, if the RF signal has been received by antenna array 222, it is conveyed through high pass filter 220 and carried over RF cable 40 to wireless adapter 34. RF cable 40 thus conveys an RF signal to or from wireless adapter 34 and also conveys the DC power signal, and the encoded control data signal to the steerable antenna system. It should be appreciated by those skilled in the art that the filter output impedances need to be chosen properly in order to enable the signals to combine properly at the wireless adaptor and avoid interference between filters. In a preferred embodiment, the filter output impedance is low in the bandpass frequencies and high outside the filter bandpass frequencies.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for conveying a plurality of different types of signals between two devices over a radio frequency (RF) cable having a single conductor with a shield, wherein the plurality of different types of signals range in frequency from a direct current (DC) signal to an RF signal, comprising the steps of:

(a) at the device where any of the plurality of different signals are provided to be conveyed to the other device, coupling each such signal to the RF cable through an associated filter, said associated filter having frequency and impedance characteristics that pass only the signal input to the associated filter and substantially excludes all other of the signals, such that the DC signal is coupled to the RF cable through a low pass filter at the device from where the DC signal is provided;

(b) conveying the plurality of different signals over the RF cable to whichever of the two devices that will be using the signals; and (c) at the other device that will be receiving each specific signal of the plurality of signals, coupling the RF cable to a corresponding one of a plurality of different filters that is characterized by passing only said specific signal and substantially excluding all other of the signals, such that the RF cable is coupled to another low pass filter at the other device receiving the DC signal, wherein an output of the low pass filter comprises an electrical power signal that is employed to energize components on the other device receiving the DC signal.

2. The method of claim 1, further comprising the step of modulating a data signal comprising the plurality of signals at the device where the data signal is provided to be conveyed, producing a modulated data signal that is coupled to the RF cable through a bandpass filter, to exclude any others of the plurality of signals.

3. The method of claim 2, further comprising the steps of coupling the RF cable to another bandpass filter at the device receiving the modulated data signal; and, demodulating the modulated data signal to recover the data signal.

4. The method of claim 1, wherein the step of coupling each such signal to the RF cable comprises the steps of coupling the RF signal to the RF cable through a high pass filter that passes the RF signal, but substantially blocks all other of the plurality of signals; and, coupling the RF cable to another high pass filter that passes the RF signal, but substantially blocks all other of the plurality of signals, so that the RF signal is provided for use by the device receiving the RF signal.

5. The method of claim 4, wherein the RF signal is used for communicating over a wireless network and is one of transmitted by the device receiving the RF signal over the RF cable, and received by the device providing the RF signal to be conveyed over the RF cable.

6. A method for coupling a first device and a second device together to convey a radio frequency (RF) signal, a data signal, and an electrical power signal between the first and the second devices, comprising the steps of:

(a) at the first device:

(i) modulating the data signal to produce a modulated signal;

(ii) coupling the modulated signal through a first bandpass filter, to an electrical conductor that connects the two devices;

(iii) coupling the electrical power signal through a first low pass filter, to the conductor;

(b) at the second device:

(i) coupling the conductor to a second bandpass filter to filter out substantially all but the modulated signal at an output of the second bandpass filter;

(ii) demodulating the modulated signal from the output of the second bandpass filter to recover the data signal for use by the second device; and (iii) coupling the conductor to a second low pass filter to filter out substantially all but the electrical power signal, the electrical power signal being used to energize the second device;

(c) at one of the first device and the second device, coupling the RF signal to the conductor through a first high pass filter; and (d) at the other of the first device and the second device:

(i) coupling the conductor to a second high pass filter, to filter out substantially all but the RF signal; and (ii) using the RF signal.

7. The method of claim 6, wherein the step of modulating the data signal comprises the step of employing a modulator that produces the modulated signal in a format that does not have a direct current component.

8. The method of claim 6, wherein the step of modulating produces the modulated signal in a frequency range with a maximum frequency that is substantially less than a frequency of the RF signal.

9. The method of claim 6, further comprising the step of converting the data signal from the demodulator to a parallel data format from a serial data format, at the second device.

10. The method of claim 6, wherein the step of using the RF signal comprises the step of coupling the RF signal to one of an antenna and a radio transceiver.

11. The method of claim 6, wherein the data signal is used to control a direction in which the radio signal is one of transmitted and received by a steerable antenna.

12. The method of claim 6, wherein the first device comprises a wireless adaptor, and wherein the second device comprises a steerable antenna system, the RF signal being used to communicate over a wireless network.

13. The method of claim 6, wherein the data signal comprises binary data having a plurality of bits, and wherein the step of modulating comprises the step of converting the data signal to a format in which for each bit, the modulated signal is above a zero voltage level for substantially a same period of time as below the zero voltage level, so that the modulated signal has an average voltage level of zero.

14. Apparatus for conveying a plurality of signals over an RF cable connecting a first device and a second device, the plurality of signals including a direct current (DC) electrical power signal, a data signal, and a radio frequency (RF) signal, wherein the RF signal is provided at one of the first device and the second device and is used at the other of the first device and the second device, comprising:

(a) at the first device:

(i) a first low pass filter coupled between a DC power source and the RF cable, said first low pass filter passing the DC electrical power signal, but substantially blocking all other of the plurality of signals; and (ii) a first bandpass filter coupled between a source of the data signal and the RF cable, said first bandpass filter passing data carried by the data signal, but substantially blocking all other of the plurality of signals;

(b) at the second device:

(i) a second low pass filter coupled between the RF cable and an electrical load that uses the DC electrical power signal conveyed over the RF cable, said second low pass filter passing the DC electrical signal to the electrical load, but substantially blocking all other of the plurality of signals; and (ii) a second bandpass filter coupled to the RF cable and having an output at which the data are accessible for use;

(c) a first high pass filter coupled to the RF cable and disposed at said one of the first device and the second device where the RF signal is provided, said first high pass filter receiving the RF signal and passing the RF signal to the RF cable, but substantially blocking all other of the plurality of signals; and (d) a second high pass filter coupled to the RF cable at the other of the first device and the second device where the RF signal is received over the RF cable, said second high pass filter passing the RF signal for use by said other of the first device and the second device, but substantially blocking all other of the plurality of signals.

15. The apparatus of claim 14, further comprising:

(a) a modulator coupled between the source of the data signal and the first bandpass filter, said modulator producing a modulated data signal that is passed through the bandpass filter and carried over the RF cable; and (b) a demodulator that is coupled to an output of the second bandpass filter and which demodulates the modulated signal to provide the data signal for use at the second device.

16. The apparatus of claim 15, further comprising a serial-to-parallel converter that is disposed at the second device and is coupled to receive the data signal and convert serial data included therein to parallel data for use at the second device.

17. The apparatus of claim 15, wherein the modulator produces modulated data in a format that does not have a direct current component.

18. The apparatus of claim 15, wherein the modulator produces the modulated data signal in a frequency range having a maximum frequency that is substantially less than a frequency of the RF signal.

19. The apparatus of claim 15, wherein the data signal comprises binary data having a plurality of bits, and wherein the modulator converts the data signal to a format in which for each bit, the modulated signal is above a zero voltage level for substantially a same period of time as below the zero voltage level, so that the modulated data signal has an average voltage level of zero.

* * * * *